(12) United States Patent
Han et al.

(10) Patent No.: US 12,002,970 B2
(45) Date of Patent: Jun. 4, 2024

(54) POUCH-TYPE SECONDARY BATTERY

(71) Applicant: SK Innovation Co., Ltd., Seoul (KR)

(72) Inventors: Jun Hee Han, Daejeon (KR); Moon Sung Kim, Daejeon (KR); Sang Baek Ryu, Daejeon (KR); Seung Hyun Yook, Daejeon (KR); Hwan Ho Jang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 226 days.

(21) Appl. No.: 17/496,607

(22) Filed: Oct. 7, 2021

(65) Prior Publication Data
US 2022/0115722 A1 Apr. 14, 2022

(30) Foreign Application Priority Data
Oct. 8, 2020 (KR) .................. 10-2020-0129928

(51) Int. Cl.
*H01M 50/105* (2021.01)
*H01M 50/178* (2021.01)
*H01M 50/186* (2021.01)

(52) U.S. Cl.
CPC ....... *H01M 50/105* (2021.01); *H01M 50/178* (2021.01); *H01M 50/186* (2021.01)

(58) Field of Classification Search
CPC . H01M 50/105; H01M 50/186; H01M 50/178
See application file for complete search history.

(56) References Cited

U.S. PATENT DOCUMENTS

2022/0123396 A1* 4/2022 Lu ..................... H01M 10/425

FOREIGN PATENT DOCUMENTS

| KR | 10-2014-0013132 A | 2/2014 |
| KR | 10-2015-0034498 A | 4/2015 |
| KR | 10-2019-0010434 A | 1/2019 |

* cited by examiner

*Primary Examiner* — Jane J Rhee
(74) *Attorney, Agent, or Firm* — IP & T GROUP LLP

(57) ABSTRACT

A pouch-type secondary battery includes: an electrode assembly including a positive electrode, a negative electrode, and a separator interposed between the positive electrode and the negative electrode; and a pouch case including a sealing portion sealed along an edge thereof to accommodate the electrode assembly therein, and a terrace portion formed to extend toward the sealing portion in which an electrode lead is disposed, wherein a notch portion at which a body of a perforator is seated is formed in the sealing portion to form a perforation portion on the terrace portion.

6 Claims, 3 Drawing Sheets

POUCH-TYPE SECONDARY BATTERY

CROSS-REFERENCE TO RELATED APPLICATION(S)

This application claims the benefit under 35 USC 119 (a) of Korean Patent Application No. 10-2020-0129928 filed on Oct. 8, 2020 in the Korean Intellectual Property Office, the entire disclosure of which is incorporated herein by reference for all purposes.

BACKGROUND

The present disclosure relates to an electrode for a secondary battery.

In general, a secondary battery refers to a battery able to be charged and discharged, unlike a primary battery that cannot be charged, and is widely used in electronic devices such as mobile phones, notebook computers, camcorders, or the like, or electric vehicles, or the like. In particular, a lithium secondary battery has a larger capacity than a nickel-cadmium battery or a nickel-hydrogen battery, which is often used as a power source for electronic equipment, and has a high energy density per unit weight, so utilization thereof is rapidly increasing.

A lithium secondary battery mainly uses a lithium-based oxide and a carbon material as a positive electrode active material and a negative electrode active material, respectively. The lithium secondary battery includes: an electrode assembly in which a positive electrode and a negative electrode to which a positive electrode active material and a negative electrode active material are applied, respectively, are disposed with a separator interposed therebetween, and a case for sealing and accommodating the electrode assembly, together with an electrolyte, that is, a battery case.

The lithium secondary battery may be classified as a can-type secondary battery in which an electrode assembly is embedded in a metal can and a pouch-type secondary battery in which an electrode assembly is embedded in a pouch of an aluminum laminate sheet according to the shape of the case.

In a pouch-type secondary battery, an electrode assembly including a negative electrode, a separator, and a positive electrode is disposed in a pouch case during a manufacturing process, an electrolyte is injected, and then an edge thereof is sealed. Then, the battery is activated through several charge/discharge cycles, and gas is generated inside a cell during this process.

As described above, although gas analysis equipment is used to analyze a gas component generated inside the secondary battery, an amount and internal pressure, and the like, when the pouch of the secondary battery is perforated while in a charged state, ignition or explosion may occur.

SUMMARY

An aspect of the present disclosure is to provide a pouch-type secondary battery having a structure in which a pouch is easily perforated for collecting and analyzing gas generated in the pouch in consideration of the above.

According to the present disclosure, a pouch-type secondary battery is provided. The pouch-type secondary battery includes: an electrode assembly including a positive electrode, a negative electrode, and a separator interposed between the positive electrode and the negative electrode; and a pouch case including a sealing portion sealed along an edge thereof to accommodate the electrode assembly therein, and a terrace portion formed to extend toward the sealing portion in which an electrode lead is disposed, wherein a notch portion at which a body of a perforator is seated is formed in the sealing portion to form a perforation portion on the terrace portion.

The notch portion may be formed in a shape of a body of the perforator.

A cross-sectional area of the notch portion may be the same as or greater than a cross-sectional area of the body of the perforator.

The notch portion may be formed at an edge of the sealing part on a side from which an electrode lead protrudes.

The notch portion may be formed in the sealing portion between the electrode leads (between the positive electrode lead and the negative electrode lead).

The one or more notch portions may be formed.

The notch portion may have one surface which is opened.

The perforation portion may be formed in a shape of a pin of the perforator.

The pouch case may be a single unit sheet-type pouch case used for packaging the electrode assembly.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
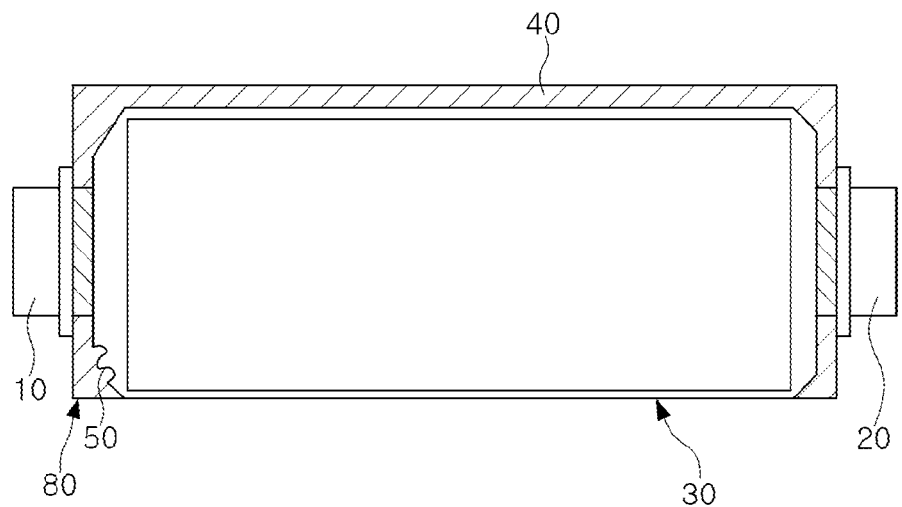
FIG. 1 schematically illustrates a pouch-type secondary battery according to an embodiment of the present disclosure.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an, " and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, exemplary embodiments will be described with reference to various examples. However, embodiments of the present disclosure may be modified in various other forms, and the scope of the present disclosure is not limited to the embodiments described below.

Figure 2:
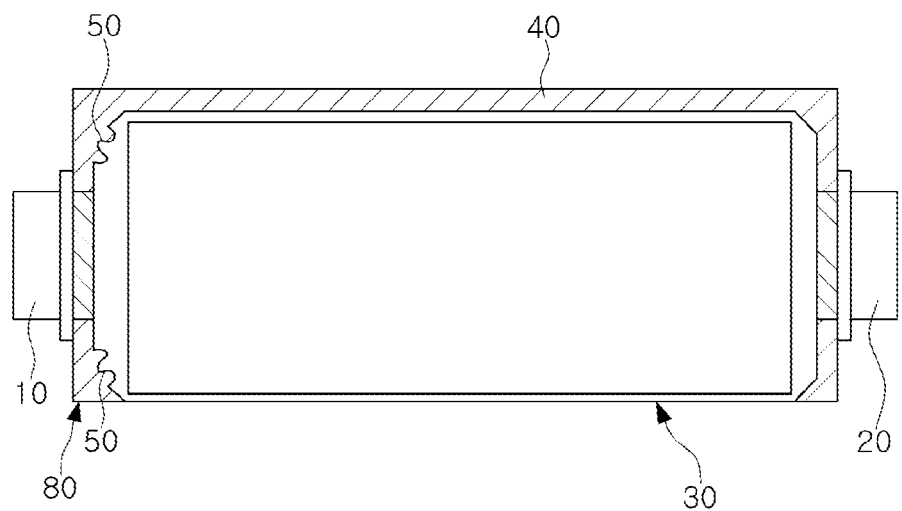
FIG. 2 schematically illustrates a pouch-type secondary battery according to another embodiment of the present disclosure.
Figure 3:
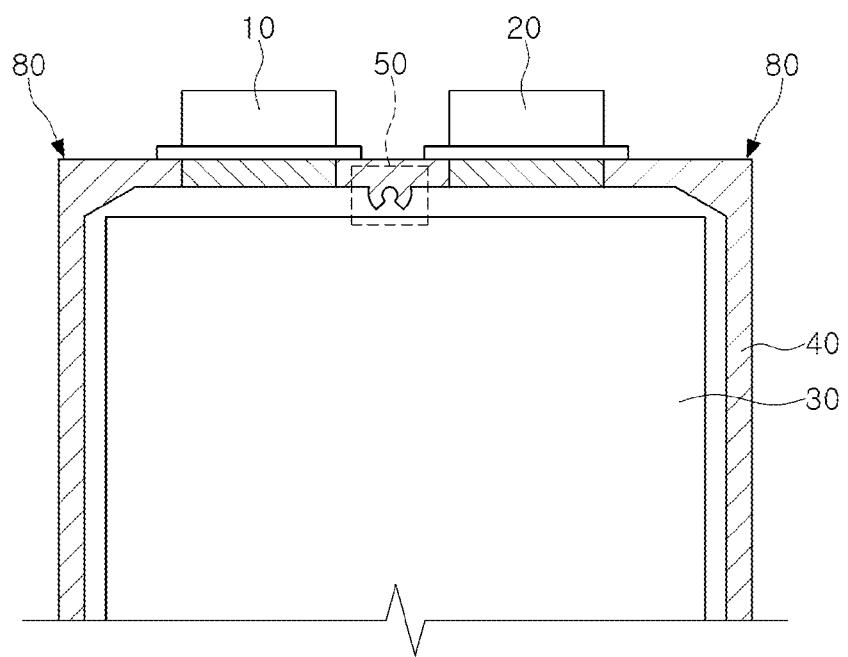
FIG. 3 schematically illustrates a pouch-type secondary battery according to another embodiment of the present disclosure.

The present disclosure relates to a pouch-type secondary battery, and more particularly, to a pouch-type secondary battery having a structure in which a pouch is easily perforated for collection and analysis of gas generated in the pouch. FIGS. 1 to 3 schematically illustrate a pouch-type secondary battery of the present disclosure, and the present disclosure will be described in detail with reference to FIGS. 1 to 3 below.

In general, a battery cell is manufactured by seating an electrode assembly in a receiving portion of a battery case, covering a cover, and then thermally sealing an outer periphery, and a sealing portion in which an electrode lead composed of a positive electrode lead and a negative electrode lead are located, and an outer periphery of the sealing portion (or 'a terrace portion of a battery cell') is formed. Meanwhile, for the analysis of a gas component generated inside the secondary battery and the analysis of an amount and internal pressure of the gas component therein, the terrace portion of the secondary battery in a charged state is perforated using a perforator to collect gas, and in this case, when adhesion between the perforator and the pouch is not smoothly performed, internal short circuit occurs due to a perforation pin made of a metal material during the perforation operation, such that there is a risk that ignition or an explosion may occur.

According to an aspect of the present disclosure, there is provided a pouch-type secondary battery cell. The pouch-type secondary battery cell includes: an electrode assembly including a positive electrode, a negative electrode, and a separator interposed between the positive electrode and the negative electrode; and a pouch case including a sealing portion sealed along an edge thereof to accommodate the electrode assembly therein, and a terrace portion formed to extend toward the sealing portion in which an electrode lead is located, wherein a notch portion at which a body of a perforator is seated is formed to form a perforation portion on the terrace portion.

In more detail, a concave notch portion is formed in some regions of the sealing portion of the secondary battery according to the present disclosure, in particular, in a boundary region between the sealing portion and the terrace portion, and accordingly, a perforation portion is formed on the terrace portion. A body of the perforator is seated on the notch portion, which is an outer periphery of the perforation portion, as will be described later, and the perforation portion is perforated by a pin of the perforator.

FIG. 1 schematically illustrates a pouch-type secondary battery according to an embodiment of the present disclosure, as a bidirectional cell in which electrode leads protrude in opposite directions, respectively. Referring to FIG. 1, a notch portion at which a body of a perforator is seated at an edge thereof on a side from an electrode lead protrudes may be formed, and a perforation portion performing perforation by a perforator pin may be formed in a terrace portion by the shape of the notch portion.

Figure 4:
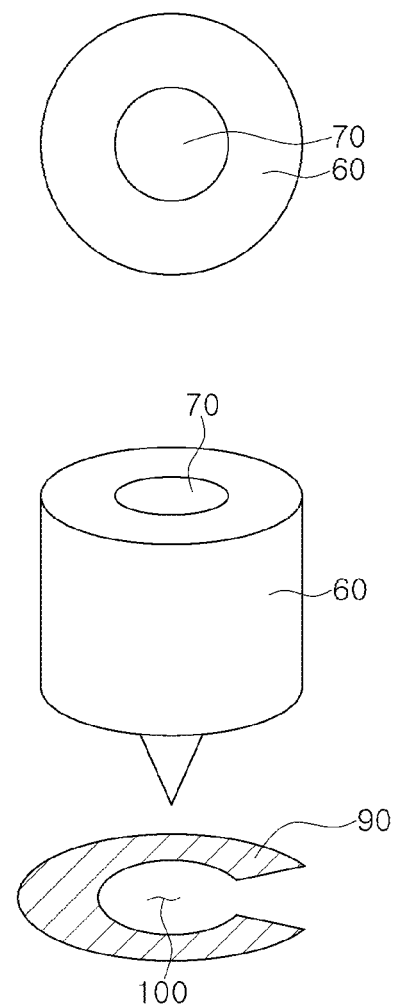
FIG. 4 schematically illustrates that a perforator is applied to a pouch-type secondary battery of the present disclosure in which a notch portion and a perforation portion at which a perforation is seated is formed.

It is preferable that the notch portion have the same shape as a shape of the body of the perforator seated on the sealing portion, and it is more preferable that the notch portion be configured such that cross-sectional areas of the notch portion and the body of the perforator are the same as each other, or the cross-sectional area of the notch portion is greater than the cross-sectional area of the body. Accordingly, it is possible to more accurately guide a position for performing perforation, as well as more stably close contact the perforator. FIG. 4 is a schematic diagram schematically illustrating an embodiment in which a perforator is applied to the pouch-type secondary battery of the present disclosure in which a notch portion at which a perforator is seated. As described above, since a notch portion having the same shape as the shape of the body of the perforator is formed in the sealing portion, and accordingly, a perforation operation is performed through a perforation portion formed in a terrace portion, it may serve to guide a site for the perforation operation.

In addition, unlike the terrace portion, since a pouch is hardened through thermal fusion, the sealing portion may serve as a support around a portion to be perforated, and accordingly, a degree of adhesion between the perforator and the pouch may be further improved, such that a stable perforation operation may be performed.

Meanwhile, it is preferable that the perforation portion is formed in a position in which contact with an electrode assembly is not made during a perforation operation using a perforation pin made of a metal material. For example, in the case of a bidirectional cell in which electrode leads protrude in the opposite direction of the pouch case, respectively, it is preferable that the notch portion and the perforation portion are formed at an edge of the sealing portion on a side from which the electrode leads protrude. Meanwhile, as shown in FIG. 3, in the case of a unidirectional cell in which electrode leads protrude in the same direction of the pouch case, it is preferable that the notch portion and the perforation portion are formed between the electrode leads, that is, between a positive electrode lead and a negative electrode lead, and accordingly, it is possible to significantly reduce possibility of internal short circuit caused by the perforation pin made of a metal material.

The number of the notch portions is not particularly limited. FIG. 2 schematically illustrates a pouch-type secondary battery according to another embodiment of the present disclosure. Referring to FIG. 2, notch portions are formed at both edges of a sealing portion of a side from which the electrode leads protrude, respectively.

According to another embodiment of the present disclosure, as described in FIGS. 1 to 4, it is preferable that the notch portion is formed such that one surface thereof is opened. By forming a notch portion in a form in which one surface thereof is opened, there is an advantage in that it is easily collect gas by inducing gas to be discharged in a specific direction after perforation.

Meanwhile, the pouch case may be a single unit of sheet-type pouch case used for packaging the electrode assembly. That is, the secondary battery according to the present disclosure may be manufactured by forming two receiving portions corresponding to each other on one aluminum laminate sheet, overlapping each other, and sealing three surfaces thereof. In the case of a secondary battery manufactured by a method of being composed of two units of pouch cases, that an upper pouch and a lower pouch, respectively, and combining the upper and lower pouches by overlapping and sealing both thereof, since a sealing portion is formed by being combined on four surfaces thereof, the risk of leaking gas or introducing air from the outside due to contact with the atmosphere on all four surfaces is greater than when using a single unit of sheet-type pouch case. In the present disclosure, by using the single unit of sheet-type pouch case, it is possible to more easily collect gas inside the secondary battery.

Meanwhile, the positive electrode, the negative electrode and the separator included in the pouch-type secondary battery of the present disclosure are not particularly limited thereto, and may be a positive electrode, a negative electrode and a separator, which are generally used.

In the case of the negative electrode, a negative electrode active material maybe applied to a negative electrode current collector to form the negative electrode, and a copper thin plate may be used as the negative electrode current collector. As the negative electrode active material, at least one carbon-based material selected from, for example, crystalline artificial graphite, crystalline natural graphite, amorphous hard carbon, low crystalline soft carbon, carbon black, acetylene black, Ketjen black, super P, grapheme and fibrous carbon, an Si-based material, a metal complex oxide such as $LiFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me': Al, B, P, Si, elements of groups 1, 2 and 3 of the periodic table, halogen; $0 < x \leq 1$; $1 \leq y \leq 3$; $1 \leq z \leq 8$) or the like, a lithium metal, a lithium alloy, a silicon alloy, a tin alloy, metal oxides such as SiO, $SiO_2$, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, a conductive polymer such as polyacetylene or the like, a Li—Co—Ni based material, a titanium oxide, or the like may be used.

In the case of the positive electrode, a positive electrode active material maybe applied to a positive electrode current collector to form the positive electrode, and an aluminum thin plate may be used as the positive electrode current collector. As the positive electrode active material, for example, a layered compound such as lithium cobalt oxide ($LiCoO_2$), lithium nickel oxide ($LiNiO_2$) or the like, a compound substituted with 1 or more transition metals, a compound represented by the formula $Li_{1+x}Mn_{2-x}O_4$ (x is 0 to 0.33), lithium manganese oxides such as $LiMnO_3$, $LiMn_2O_3$, $LiMnO_2$, or the like, lithium copper oxide ($Li_2CuO_2$); a vanadium oxide such as $LiV_3O_8$, $LiFe_3O_4$, $V_2O_5$, $Cu_2V_2O_7$, or the like, a Ni-site type lithium nickel oxide represented by the formula $LiNi_{1-x}M_xO_2$ (where M=Co, Mn, Al, Cu, Fe, Mg, B or Ga and x=0.01 to 0.3); a lithium manganese composite oxide represented by the formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn), a lithium manganese composite oxide of a spinel structure represented by $LiNi_xMn_{2-x}O_4$, $LiMn_2O_4$ in which a portion of Li in the formula is substituted with an alkaline earth metal ion, disulfide compounds, $Fe_2(MoO_4)_3$, lithium nickel manganese cobalt composite oxide (NMC), and the like, without limitation, but the examples thereof are not limited thereto.

In addition, the positive electrode and the negative electrode may further include a binder, if necessary, to improve bonding strength between the electrode current collector and an electrode mixture layer and within the electrode mixture layer, but is not specifically limited thereto. For example, as the binder, one or a mixture thereof selected from a group consisting of polyvinylidene fluoride (PVdF) homopolymer, polyvinylidene fluoride-hexafluoropropylene copolymer (PVdF-HFP), polymethylmethacrylate, polyacrylonitrile, polyvinylpyrrolidone, polyvinylacetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrilestyrene-butadiene copolymer, and the like, maybe used.

In addition, a conductive material maybe used to impart conductivity to the electrode, and the conductive material is not particularly limited as long as it has conductivity without causing side reactions with other elements of the secondary battery. Detailed examples of the conductive material may include graphite such as natural graphite, artificial graphite or the like; carbon-based materials such as carbon black, acetylene black, ketjen black, channel black, furnace black, lamp black, thermal black, carbon fiber or the like; metal powder particles or metal fibers such as copper, nickel, aluminum, silver or the like; conductive whisker such as zinc oxide and potassium titanate or the like; conductive metal oxides such as titanium oxide; or a conductive polymer such as a polyphenylene derivative or the like, and one thereof alone or a mixture of two or more may be used.

Meanwhile, as the separator, for example, a form of a porous polymer film or nonwoven fabric, such as a polyolefin series such as polyethylene and polypropylene, polyester series, pulp, which is natural polymer, cellulose, cork, or the like, may be used, and a structure of a single layer film or a multilayer film may be used. In addition, a thermoplastic polyolefin polymeric porous multilayer film (Tm 100 to 150° C.) such as polyethylene or polypropylene or a high molecular weight thermoplastic heat-resistant polyolefin polymeric porous film (Tm 150 to 200° C.) may be used.

As set forth above, according to the present disclosure, a notch portion having the same shape and area as a contact surface of a perforator may be formed to improve adhesion between the pouch and the perforator, stable perforation may be performed by performing a perforation operation in the notch portion, and it is possible to prevent a problem of internal short circuit that may occur in a perforation process using a perforation pin made of a metal material and a problem of ignition of the secondary battery in advance.

In addition, by increasing a sealing area by forming the notch portion, since a volume of an internal space of the pouch is reduced, so that even if a small amount of gas is generated, it may be easily collected, so that it is possible to analyze a small amount of gas.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DETAILED DESCRIPTION OF MAIN ELEMENTS

10, 20: electrode lead
30: pouch-type secondary battery
40: side sealing portion
50, 90: notch portion
60: body of a perforator
70: punch-pin of a perforator
80: terrace portion
100: perforation portion

What is claimed is:

1. A pouch-type secondary battery, comprising:
    an electrode assembly including a positive electrode, a negative electrode, and a separator interposed between the positive electrode and the negative electrode; and
    a pouch case including a sealing portion sealed along an edge thereof to accommodate the electrode assembly therein, and a terrace portion formed to extend toward the sealing portion in which an electrode lead is disposed,
    wherein a notch portion is formed to be spaced apart from one surface of the sealing portion adjacent to the notch portion in a longitudinal direction of the pouch-type secondary battery in the sealing portion.

2. The pouch-type secondary battery of claim 1, wherein the notch portion is formed at an edge of the sealing portion on a side from which an electrode lead protrudes.

3. The pouch-type secondary battery of claim 1, wherein the notch portion is formed in the sealing portion between the positive electrode lead and the negative electrode lead.

4. The pouch-type secondary battery of claim 1, wherein two or more notch portions are formed.

5. The pouch-type secondary battery of claim 1, wherein the notch portion has one surface which is opened.

6. The pouch-type secondary battery of claim 1, wherein the pouch case is a single unit of sheet-type pouch case used for packaging the electrode assembly.

* * * * *